(12) United States Patent
Sliger et al.

(10) Patent No.: US 7,600,225 B2
(45) Date of Patent: Oct. 6, 2009

(54) SYSTEM AND METHOD FOR INTRA-PACKAGE DELTA COMPRESSION OF DATA

(75) Inventors: Michael Sliger, Sammamish, WA (US); Thomas McGuire, Georgetown, TX (US); Manojkumar Shende, Redmond, WA (US); Alexander Petrov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 627 days.

(21) Appl. No.: 10/633,375

(22) Filed: Jul. 21, 2003

(65) Prior Publication Data
US 2005/0022175 A1 Jan. 27, 2005

(51) Int. Cl.
G06F 9/44 (2006.01)
G06F 9/445 (2006.01)
G06F 12/00 (2006.01)
G06F 17/00 (2006.01)

(52) U.S. Cl. ........................ 717/169; 717/174; 717/175; 707/204

(58) Field of Classification Search ................... 717/169
See application file for complete search history.

(56) References Cited

U.S. PATENT DOCUMENTS 6,131,192 A 10/2000 Henry
6,216,175 B1* 4/2001 Sliger et al. .................. 717/169
6,381,742 B2* 4/2002 Forbes et al. ................. 717/176
6,604,236 B1* 8/2003 Draper et al. ................ 717/170
2002/0099726 A1* 7/2002 Crudele et al. ............... 707/200

FOREIGN PATENT DOCUMENTS

EP 1315067 A2 5/2003

OTHER PUBLICATIONS

Mark Allen Weiss, DataStructures & Algorithm Analysisi in C++, second Edition, 1999, published by Adison Wesley, pp. 356-362.*
Anonymous, International Search Report in Corresponding EP Application No. EP 04 10 2794.
Ouyang, Zan et al. "Cluster-Based Delta Compression of a Collection of Files." Copyright 2002 IEEE. pp. 1-10.

* cited by examiner

*Primary Examiner*—Tuan Q Dam
*Assistant Examiner*—Zheng Wei
(74) *Attorney, Agent, or Firm*—Workman Nydegger (57) ABSTRACT

A system and method for providing file data, such as a set of files for updating a computer system, in a self-contained package, in which the package size is significantly reduced via delta compression. A build mechanism examines files to be distributed, and generates a self-contained package containing files and deltas. To this end, a directed graph is built from the sizes of the various base file and delta file possibilities, and a minimum spanning tree computation selects the files that result in the smallest package. A base file may have multiple deltas applied to synthesize multiple files, and any base file may itself have been previously synthesized from another base file and a delta. A client extraction mechanism, optionally provided with the package, works with the contents of the package as directed by a manifest to synthesize target files from the base files and the contained deltas.

10 Claims, 7 Drawing Sheets

SYSTEM AND METHOD FOR INTRA-PACKAGE DELTA COMPRESSION OF DATA

FIELD OF THE INVENTION

The invention relates generally to computer systems, and more particularly to packaged computer files.

BACKGROUND OF THE INVENTION

When a software vendor wants to provide a set of one or more files to its customers, such as a new product release or relatively large upgrade, the file or files may be merged into an archive to make a single package of the related contents, wherein a package is generally some collection of data files used as a set. Often the archive is made into a self-extracting archive, by adding executable code which when executed extracts the contents of the package back into the set of files that were previously merged. The self-extracting code may also initiate a setup procedure, typically by executing one of the files that was just extracted, which in turn copies the files to appropriate locations on a customer's computer. Upon completion of the setup procedure, the self-extracting code deletes the extracted files, and then terminates. In most cases, this allows an entire product feature or update to be retrieved as a single file object, which can be directly executed to access or install the product's contents.

The archive process ordinarily will use some sort of data compression to reduce the size of the archive, which reduces the costs of distribution and retrieval, particularly for large archives. One such compression technique compresses the files separately, providing the customer with access to any individual file as needed. The size of such a package is generally the sum of the compressed sizes of each included file, plus the size of the extraction code. Upon execution, the package extracts each of the compressed files to a temporary location, from which a user can copy each file to a proper location in the system's directory.

For packages where individual file access is not necessary, such as when a setup procedure is automatically run to install the extracted files, package compression is further improved by the use of cabinet (or CAB) files, in which the files are essentially appended to one another (concatenated) prior to compression. This improves encoding efficiency with LZ-based encoders, (which are well-known types of dictionary encoders named after originating work done by Lempel and Ziv), because with LZ encoding, compression of an input data stream depends on a preceding portion of the input data stream known as the history, and the concatenation of the files increases the amount of history data that is available. Note that with compressed files, the compressed data is decompressed during extraction, so that the files are in their original form before the setup procedure runs to operate on those files.

Even with compression techniques, packages can be large relative to the amount of data that can be conveniently transmitted over a network, for example. For customers not having broadband network access, the large size of packages makes it impractical or at least very inconvenient to download such packages. Some customers have to pay long-distance or connection time charges to download data, and others may have quotas on the amount of data that can be downloaded and/or a limit on the connection time of a session. Other customers simply will not bother with downloading large files over a modem. Large file downloads are further vulnerable to network connection problems that terminate a session. For such customers, large package distribution is a problem.

The package vendors also have costs that are relative to the size of downloads they provide. For example, distributing large files requires a significant amount of network server equipment, which is expensive. CD-ROMs are often made available at the vendor's expense for some customers. Even distribution over the internet has variable costs which increase when larger packages are transmitted.

An improved way of providing updates that reduces the amount of data that needs to be transmitted is described in U.S. Pat. No. 6,493,871. In this approach, a client (customer) computer first obtains from a setup server an initial setup package that includes a setup program and a list of files required for installing the software product. A setup program on the client computer then determines whether some current or earlier versions of those files required for installation already exist on the client computer, and compiles a request list of files needed for updating the client computer. The client computer sends the request list to a download server, which maintains a collection of update files and patches, and responds to the request list by transmitting an appropriate set of files that are needed for updating to the client. One or more of the files may be in the form of patches, in which a patch is a small data file derived from an earlier version of a file and a newer version of that file. The patch can be applied to a copy of the earlier file version already at the client computer to produce the new version, eliminating the need to download the full new version.

While such data compression this can significantly reduce the amount of data that a client has to download, this technique also has a number of drawbacks. For one, such binary patching, also referred to as delta compression, only works when the vendor knows (or can safely assume) which representations of a file are already available at a given client's computer. This is not always possible, such as with a CD-ROM or other fixed distribution scheme. Note that it is feasible to have a single generic archive update various versions of files that a vendor's customers may be using by including multiple files in the archive for each different version, one of which can be applied to any given version of a file that a particular client may have. However this is also not efficient, and is not practical or manageable in situations where there are a large number of files (e.g., on the order of hundreds or even thousands) that need to be updated via a package. Much of the savings achieved via delta compression would be lost by having to deal with multiple versions for large numbers of files.

In summary, conventional compression is costly and/or inadequate to many users and vendors because the sizes of the resultant compressed packages are still too large for easy distribution. At the same time, delta compression has not heretofore worked well for customers and/or vendors who need or want to use self-contained packages that do not require dynamic customization at the server for each customer. What is needed is a way to provide software product data that is highly efficient, yet also substantially self-contained in a package.

SUMMARY OF THE INVENTION

Briefly, the present invention provides a system and method that provides data in a self-contained package, in which the amount of data is significantly reduced via delta compression. To this end, one group of files (which can be any set of related data) is packaged in a usual (compressed) form, while a second group is represented as deltas derived from the first or second group's output. The package thus contains a collection of deltas to be applied to other files within or previously derived from the same package.

The intra-package delta system and method of the present invention includes two primary mechanisms, a build mechanism and a client mechanism. In general, the build mechanism examines a set of files (target files) to distribute to generate an optimized self-contained intra-package delta package, while the client component works with the contents of the package to synthesize the target files from the contained deltas.

The intra-package delta mechanism at the vendor exploits similarities between files in a package to reduce the total package size. This works particularly well for updates, because updates usually carry more than one binary file, and frequently these binary files are related to each other by having some shared common source code or libraries. Updates also often provide equivalent files for a different scenario, e.g., various equivalent files for different languages.

In one implementation, the self-contained delta compressed package is arranged such that most of the files are synthesized from a base file and a delta, with a single base file being able to have multiple deltas applied thereto to synthesize multiple files, and/or in which any base file may itself have been previously synthesized from another base file and a delta. Thus, a package built via the intra-package delta mechanism may carry a single base file, which itself may be compressed in some manner, plus any number of deltas which can transform copies of that base file to synthesize other files. Deltas can also be applied to a file output from a previous synthesis, allowing an optimal source selection for each target file. If any assumptions can be made about files that are already available on the receiving end, copies of existing files or deltas applied to copies can be added to the set of target files to recreate the complete package, further reducing the package size.

In one implementation, the intra-package delta mechanism automatically generates the deltas for an intra-package delta compressed package. To this end, given a list of target files needed to be provided via the package, the mechanism explores the various possibilities to synthesize each file, creates the possible deltas, and examines the resultant file sizes to determine which of the base files and deltas will result in the smallest package size while fully recreating the target files upon later extraction at the client. The instructions needed to perform the extraction (e.g., in the proper order) are saved in a manifest file, while the information needed to finalize the packaging is saved to a directives file, e.g., so that a cabinet file can be generated that includes the base files, deltas and manifest file, along with any other needed files such as an executable extraction tool that the client will run to perform the extraction.

At the client, an intra-package delta self-extractor framework includes the executable extraction tool that creates a temporary directory, expands the contents of the package as with a conventional package, but before starting the setup program, performs additional processing in accordance with an aspect of the present invention. To this end, the extraction tool interprets the manifest to apply the deltas to synthesize (some of) the target files from base file or files that were in the package, or from a base file that itself was previously synthesized. The extraction tool may discard the delta files before starting setup program so that the setup program only sees the full set of decompressed and/or synthesized target files. As can be readily appreciated, having some files in the package as (compressed) base files, with other files carried as deltas based on the compressed base files, can significantly reduce the size of a package. Note that the form and application of packages utilizing intra-package deltas is the same as conventional self-contained package from the perspective of existing components, even if the customer simply extracts the contents of the package without starting a setup process. This is because the delta processing of intra-package delta content is performed transparently by the self-extracting executable code.

Other advantages will become apparent from the following detailed description when taken in conjunction with the drawings, in which:

DETAILED DESCRIPTION

Exemplary Operating Environment

Figure 1:
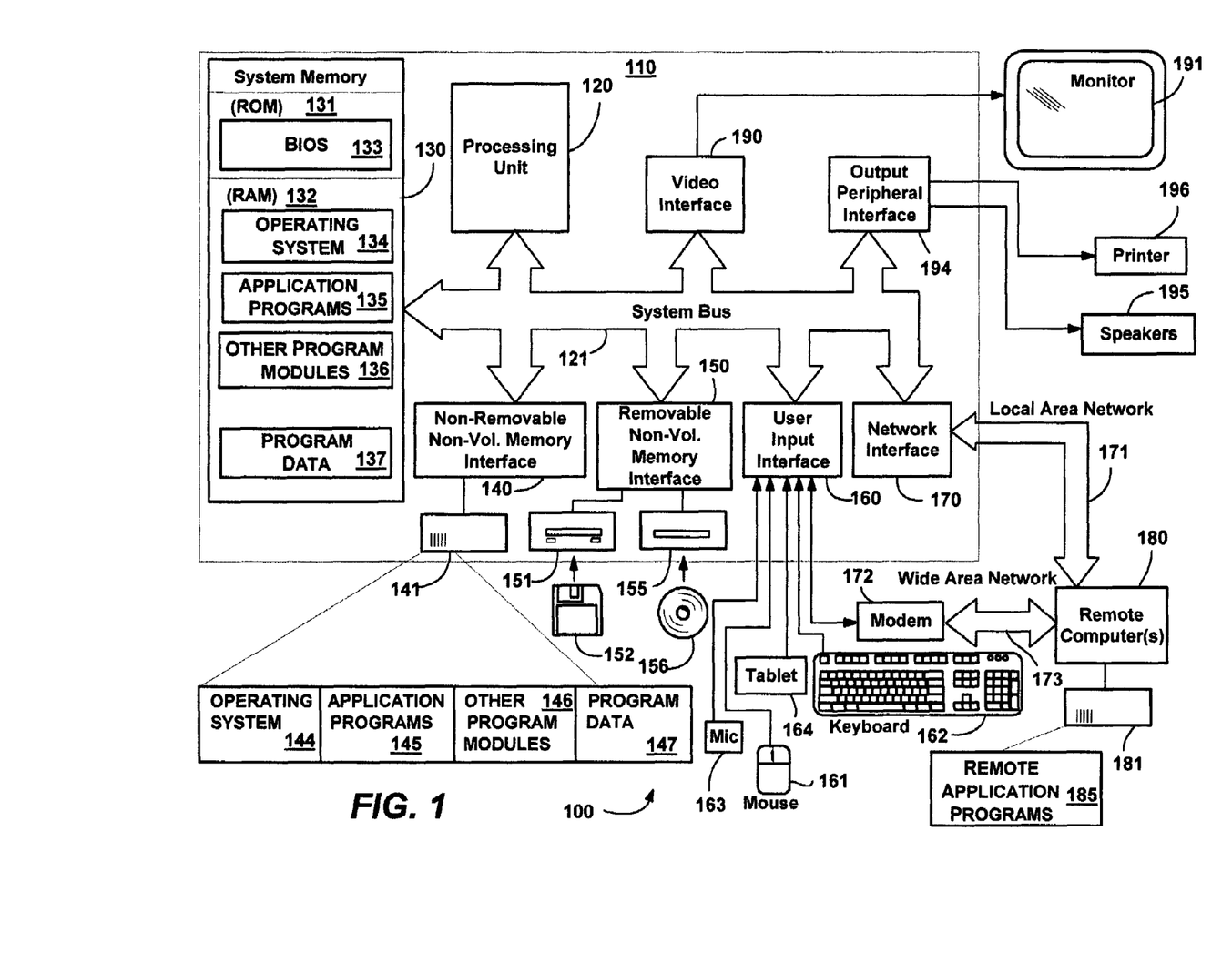
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, video games, cellular or other telephony products, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN)

171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Intra-Package Delta Compression

The present invention is, in part, generally directed towards a method and system for providing a self-contained package of files and delta-compressed files (hereinafter deltas), that when extracted, produce the files that an installer or the like needs to update a computer system. Thus, many of the examples herein will be generally directed towards providing a package of updates. As will be understood however, there are numerous uses for such a product beyond updates. For example, an entirely new installation such as a suite of software applications may be provided as a self-contained package of files and delta-compressed files, in accordance with an aspect of the present invention. Other data files may likewise benefit from the system and method of the present invention, although the present invention tends to work very well in terms of reducing the size of packages containing many executable files and/or largely equivalent files such as those that vary by scenario. Moreover, as used herein, the terms "file" or "files" may include what is conventionally thought of as a file, but may further include virtually any collection of data, such as stock quotes, byte streams and so forth that are not necessarily arranged as conventional file system files.

Further, although the packages described herein will be referred to as self-contained, it will be readily appreciated that a package need not be completely self-contained to benefit from the present invention. The present invention can be combined with the conventional use of deltas. A hybrid can be constructed which contains a delta which uses an existing file as a base file. The file synthesized from this delta may then be used as a base for another delta in the package. For example, it is feasible to have some knowledge of what files a user has on a given computer, e.g., the self-extracting program that reads the package contents may be an operating system component that ordinarily is present on a user's computer system, whereby that program need not be included as part of the package. Also, a given file version may be known to be present on a customer's computer, such as if the update is to a file of which at present can only be one version. Based on such knowledge, the package production procedure can sometimes avoid having to include certain data, further reducing the package size.

Figure 2:
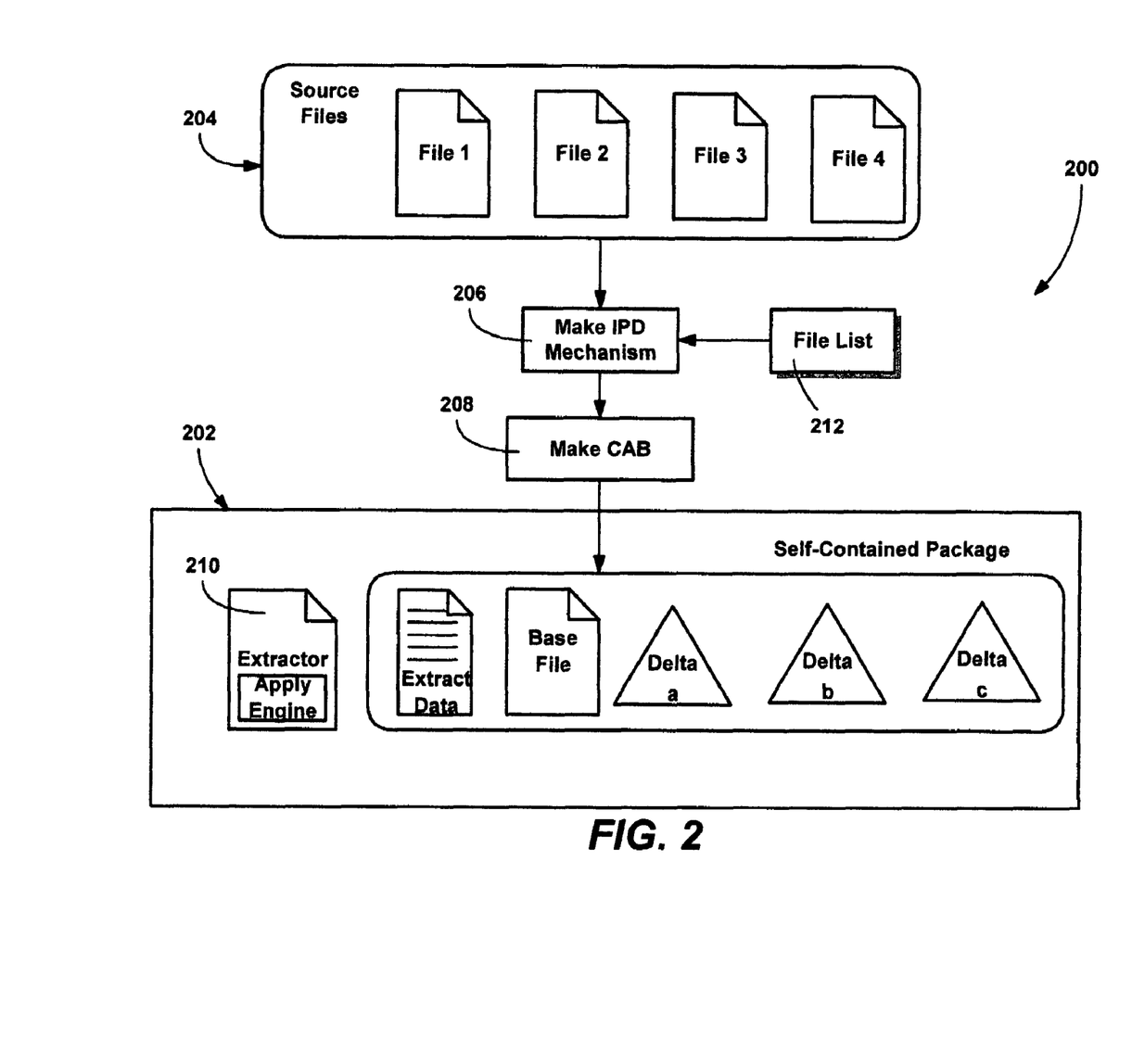
FIG. 2 is a block diagram generally representing generation of a self-contained package using intra-package delta compression in accordance with an aspect of the present invention.

In general, as represented in FIG. 2, one aspect of the present invention operates in a package production environment 200, which constructs a self-contained, intra-package delta compressed package 202 comprising files and deltas, in a manner that attempts to minimize (at least to a reasonable extent) the size of the data that the package needs to contain. To this end, a set of source files 204 is provided, which may comprise the new file versions that the package wants to include, (but may possibly contain any older file versions as necessary to generate deltas). These source files 204 generally correspond to the target files that the client needs to have. In general, a make intra-package deltas (IPD) mechanism 206 first processes the source files 204 (e.g., by reading a list thereof) into base files and or deltas in accordance with an aspect of the present invention, as described below. Then, a make CAB (cabinet file) mechanism, which may be a conventional process, compresses the base files and or deltas data into the self-contained package 202. Other compression techniques may be used.

Note that prior art techniques require an older version of a file to generate a delta. For example, known techniques for delta compression input the original file (or some later version thereof), along with a new version, into a delta creation engine that generates a delta file; the delta is later applied at the client to that original version to recreate the new version. These techniques, along with improvements to same that result in better compression, are described in U.S. Pat. No. 6,496,974 entitled "File update performing comparison and compression as single process;" U.S. Pat. No. 6,493,871 entitled "Method and system for downloading updates for software installation;" U.S. Pat. No. 6,466,999 entitled "Preprocessing a reference data stream for patch generation and compression;" U.S. Pat. No. 6,449,764 entitled "File update by pre-initializing compressor/decompressor with other than decompression aid data; and U.S. Pat. No. 6,243,766 entitled "Method and system for updating software with smaller patch files;" and U.S. Pat. No. 6,216,175 entitled "Method for upgrading copies of an original file with same update data after normalizing differences between copies created during respective original installations."

In accordance with an aspect of the present invention, and as described below, in general, no assumption needs to be made about the identity of the base file that is used to generate a delta, wherein as used herein, a base file is any file to which a delta is later applied to produce another file. Thus, unlike the prior techniques, any file, not just an earlier version of the same file, may be used as a base file from which another file may be synthesized by applying a delta. For example, instead of generating a delta from previous file version and a new file version, a delta may be generated from what may appear to human observers to be essentially unrelated files. For example, it may turn out that for a given set of files, a spreadsheet component file may be used as a base file for a delta that when applied synthesizes a word processing component file. Further, a single base file may be reused with multiple deltas to synthesize multiple resultant files.

Thus, in one implementation, the source files 204 need not include any older file versions, as the system and method of the present invention may use deltas derived from only (one or more) newer file versions. For example, in FIG. 2, File 1 can be a new file version included as an update as part of a package 204, and also may be used to generate Delta a from File 2, Delta b from File 3 and Delta c from File 4. Then, when later extracted at a client customer by applying those deltas to File 1 (as described below with reference to FIG. 6), the four target files File 1-File 4 are available at the client machine for use by a setup program or the like. Note that it is possible to have a package contain one or more based files that are used to synthesize other files but are then discarded and not actually part of the final file set, and, for example, not used by the setup procedure, as described below.

In accordance with another aspect of the present invention, and as also described below with reference to FIG. 7, the base file to which a delta is applied to synthesize a file may itself have been synthesized from a previous delta decompression operation. Thus, for example, in FIG. 7 File 2 may be created from File 1 and Delta a. Then, File 2 is used as a base file to which a delta b is applied to produce file 3. Thus, a number of new concepts are provided with the present invention, each of which working to provides a reduction in the amount of data needed in the package.

Furthermore, it is feasible to use a file version as a base file for generating a delta for another file version, and include that base file in the package for extraction purposes as needed, even though that base file will be deleted and not used by the setup procedure. For example, in FIG. 7, File 1 may be an older file version used to create the deltas, placed in the package, and used by the extractor 210 to create the other files, but then deleted before the setup procedure.

Figure 3:
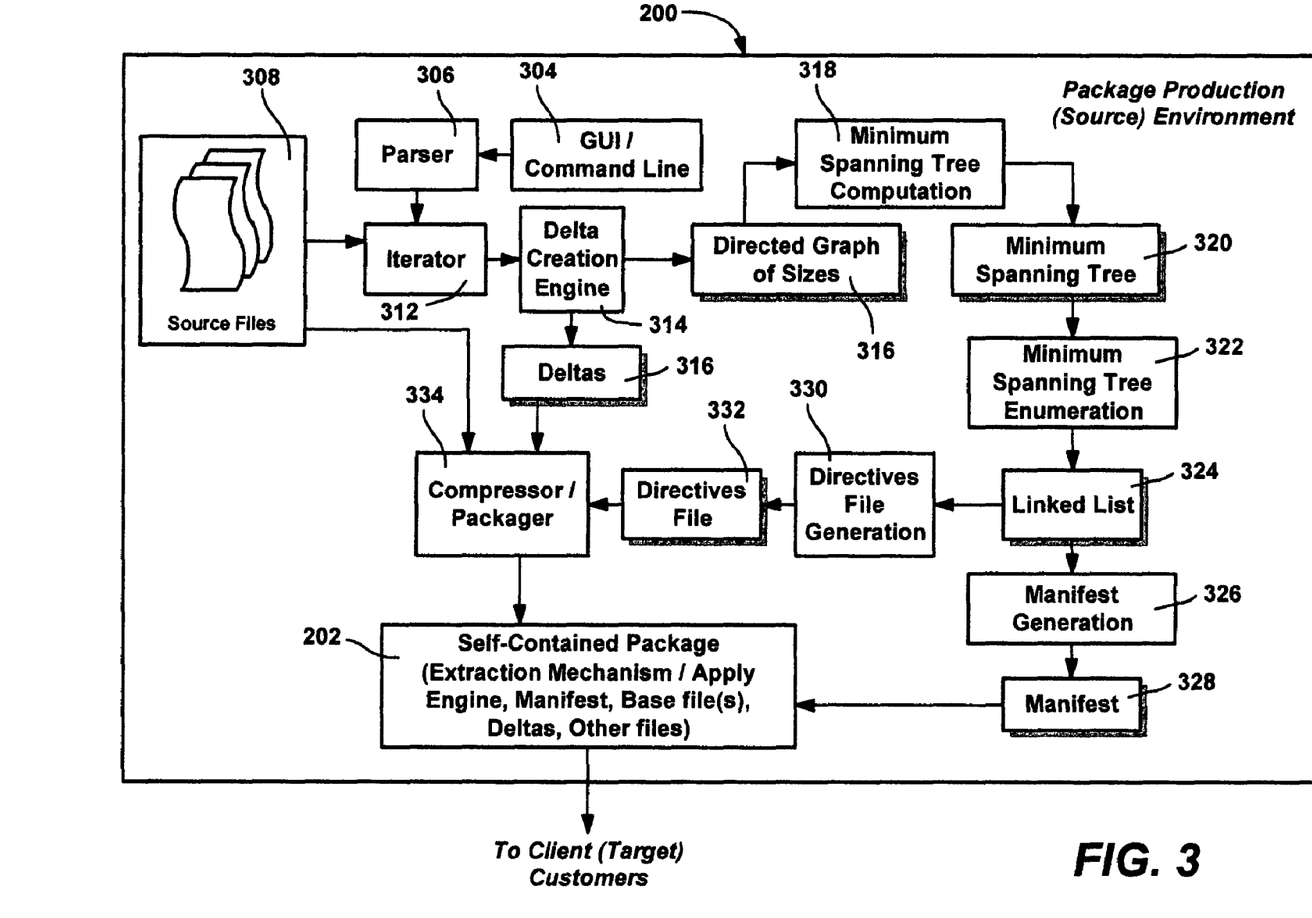
FIG. 3 is a block diagram generally representing components in a package production source environment, such as at a software vendor, that generate a self-contained package using intra-package delta compression in accordance with an aspect of the present invention.

Turning to FIG. 3 of the drawings, there is shown the components in one implementation of the package production environment 200 (FIG. 2). Typically this environment 200 is implemented via a set of one or more computers at a software vendor or some third party associated with the vendor that needs to produce a package. Note that this production environment 200 is ordinarily not something dynamically operated in response to a client request, but rather is a computationally-expensive process that may take a relatively long time on the order of hours or days to produce the self-contained package 202.

In general, the MakeIPD mechanism 206 reads a supplied file list 212 to determine which files go into the package, and where those files can be found. For example, the file list may contain a [Files] section, with each entry specifying the name of the file within the package, as well as the full path to the file. The file list might also specify certain reference files known to exist on the user's computer, not needed in the present package, but which can be used to construct the hybrid described above. These files can be considered as potential bases for any other files in the package.

The file list 212 can also specify some processing options, e.g., in an [Options] section. For example, a "Run" directive may be provided (e.g., as a pass-through to the manifest file) to specify which file within the package should be executed after extraction, if any. A Verify directive can be set to cause the MakeIPD mechanism generate a [Verify] section for all package files. A PatchDLL directive identifies a file that is passed through to the manifest file, and also causes the MakeIPD mechanism 206 to include this file in the script used when creating the cabinet file, as well as considering this file as a potential base for any other files in the package.

As represented in FIG. 3, in one implementation the overall production process is initiated from a GUI or command line 304, which is interpreted by a parser 306 to determine operation parameters. Operation parameters may include identifying the file list 212, which as described above identifies the source files 308 to use, e.g., in a text file list of the filenames containing the names of the files needed in the package. Path information may also be provided to specify one or more directories (e.g., separated by semicolons) which may contain the symbol files needed, as described below. If not specified, the directories used will be the directories of the source files.

Also, as another operation parameter, a directory may be specified for use with various intermediate files that are used during the package construction process. More particularly, the MakeIPD mechanism 206 creates a number of intermediate files during processing, and are maintained in a specified working directory. Such files include symbol listings, delta files, and the manifest file, which describes the solution as a set of delta decompression instructions. Note that if the MakeIPD mechanism 206 is subsequently run and the same working directory is specified, any existing files may be used to assist in the analysis. For example, if all needed files are still available, the MakeIPD mechanism 206 will complete its operation rapidly, e.g., on the order of seconds. If only some of the package files have changed since a previous build, reusing unaffected deltas will save considerable processing time.

Another option may specify the name of a script used in creating the final package, e.g., in CAB compressed form. Other operation parameters may specify the location of an existing manifest which may be imported to copy the solution from some previous run, as described below. Also, different types of output (e.g., to the user or to a text file) during processing may be specified by the user, e.g., to allow a choice of concise or verbose output, or suppress the output.

The file list is parsed, in which each entry provides the location of the source file and the name of that source file within the package. Any input file options are parsed, which may include the name of the file to execute after extraction, the name of a delta-apply engine (e.g., a DLL) to be used as the extractor, and whether the self-extraction mechanism should verify the files' signatures (e.g., MD5 hash-generated) after extraction, (wherein MD5 refers to the RSA Data Security, Inc. Message Digest Algorithm 5, aka Internet RFC 1321. Any suitable error detection or integrity verification hash could be used, including CRC, MD5, SHA1 and so forth).

As a further part of the pre-processing, an entry is added to the file list for the manifest file, described below, as well as an entry for the delta-apply engine. Also, MD5 signatures are calculated for the source files 308, to identify any duplicates as copies of the original occurrence. If the file is an executable file, details are extracted about its symbol file.

More particularly, the aforementioned U.S. Pat. No. 6,466, 999 describes the use of symbols for executable files (e.g., EXE, DLL, OCX, SYS, and so forth) to get a more optimal size reduction when using deltas. The MakeIPD mechanism 206 leverages this technology, and will look for symbols in the same directories where the source files are provided. Additional symbol directories can be explicitly provided using an option, with each directory separated by a semicolon. Each directory specified will be recursively searched for any symbols which could benefit the analysis. The symbol path is scanned, looking for any symbol files identified.

For each unique source file, the MakeIPD mechanism 206 generates a list of prospective delta inputs, including an entry for each other unique source file in the package. These lists will have a total of $N \cdot (N-1)$, or nearly $N^2$, total entries.

In accordance with an aspect of the present invention, an iterator component 312 of the MakeIPD mechanism 206 creates a delta for each prospective delta on each file's list, by inputting the file and each file on that file's list into a delta creation engine 314. If both inputs for creating the delta are executable files, any available symbol information is used to optimize the size of the deltas, as described in the aforementioned U.S. Pat. No. 6,466,999; (note that in general, suitable delta creation engines 314 are described in the aforementioned U.S. patents). These deltas 316 are stored in the working directory, and the size of each delta is added to the list entry for the next calculation.

In accordance with another aspect of the present invention, from this size and file identity information a directed graph 316 is generated. More particularly, each source file is added to the directed graph 316 as a vertex, and each prospective delta is added as an edge, with the weight equal to the size of that delta. Also included are edges from a "NULL" vertex to each of the source file vertices, with the weight equal to the compressed size of that source file.

Figure 4:
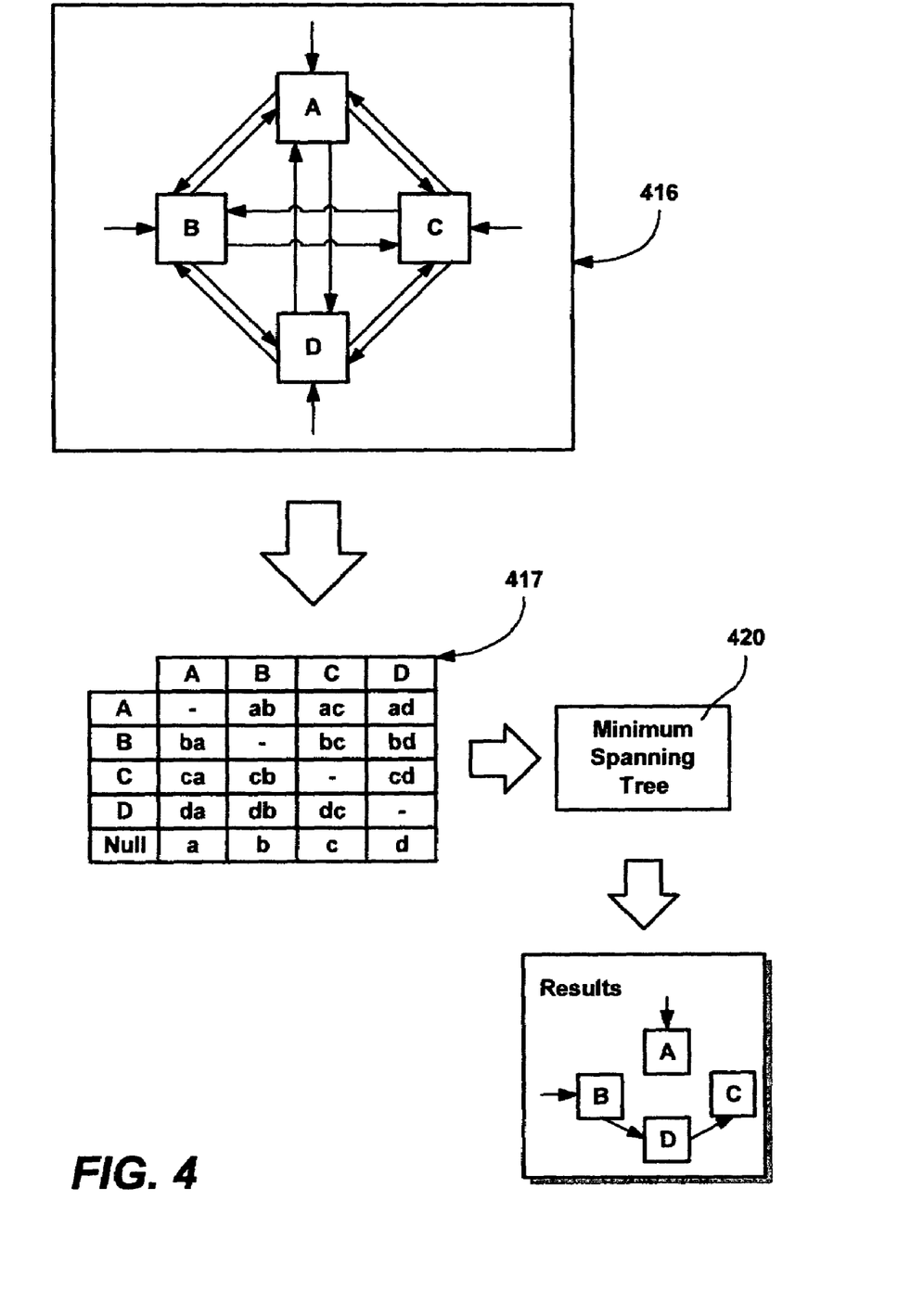
FIG. 4 is a block diagram generally representing how base files and/or deltas may be selected for inclusion in an intra-package delta compression package, in accordance with an aspect of the present invention.

By way of example, as represented in FIG. 4, consider a directed graph 416 generated from iterating over four source files, A, B, C, and D. As can be seen in conjunction with the alternative table representation 417 of this information, each file is a vertex, and each prospective delta is a size value, e.g., there is a size ba of a delta for using file A as a base file and file B as the synthesized file, and vice-versa for size ab. There is also a size b for simply compressing B, e.g., using a "NULL" vertex as an edge.

From this information, a minimum spanning tree 320 may be computed on the directed graph 316. To this end, one of a variety of well-known minimum spanning tree computations 318 may be employed, some with nearly linear run time. Such minimum spanning tree computations are described in computer science literature, and will be described herein only briefly.

Conceptually, each file will be derived from the smallest available delta. However, it is important that no circular reference be formed, as a file cannot be used synthesize itself. Certain deltas are excluded to break these cycles. The process is globally optimized such that other deltas may be forfeited to permit the use of another more-promising delta, to minimize the total size. This problem maps to the problem known as the "directed minimum spanning tree." An equivalent solution can be constructed using the delta's savings for edge weights, and seeking the directed maximum spanning tree.

The spanning tree is then enumerated, using the "null" vertex as the root. Edges leaving the root vertex correspond to files which are to be simply compressed in the package. Edges leaving other vertices correspond to one using of the generated deltas. Continuing with the example of FIG. 4, it is seen that the minimum spanning tree 420 is enumerated into a resultant solution with A being simply compressed, B being compressed and used as a base file from which the file D will be synthesized from the appropriate delta. In turn, the file C will be synthesized from the synthesized base file D and the appropriate delta for generating C from D. As can be appreciated, the minimum spanning tree based on the sizes as weights provides the smallest package possible when used in this manner.

Returning to FIG. 3, the enumeration 322 essentially marks each source file's solution (compressed or delta), and creates a linked list 324 of the source files in the order they are found in the tree. From this linked list 324 (and some other file information, described above), a manifest generation process 326 formats the manifest file 328, as described below. Essentially, the manifest file 332 directs the operation of the extractor 210 when run on the client computer. Note that the operations are listed in the manifest 326 in a particular order, and will be performed in this order, to assure that the extractor does not run into a situation where a file needs to be synthesized to serve as a base file for applying a delta but does not yet exist. For example, in FIG. 4, file D needs to be synthesized from file B before file C can be synthesized from file D.

Additionally, the MakeIPD mechanism 206 includes a directives file generation component 330 that generates a directives file 332, from which the compressed package will be created. The directives file contains the locations of the source files and the deltas in the temporary directory, and the names of those files within the package. A compressor/packager 334 component such as a conventional MakeCAB mechanism 208 (FIG. 2) employs the directives file to generate the self-contained, delta compressed package 202. A parameter option specifies the path and name for the directives file to be created, and using this directives file a CAB file in the same path with the same base filename.

Although the simplified example of FIG. 4 used only four files, the MakeIPD mechanism 206 can take a relatively long time to analyze a package's contents. Thus, avoiding the iteration/analysis part of the process is desirable when possible. For example, when multiple packages need to be generated, each containing roughly the same content, the solution (e.g., maintained in a manifest) from a previous run can be used to more directly specify the solution for the current package. This may occur when generating packages for additional languages, after a first package has been optimized. Another time this may be available would be when rebuilding a package because of a small change in the content.

To leverage an existing solution for constructing a package, the MakeIPD mechanism 206 can import a solution. For example, if specified as a parameter option, the parameter can specify a directory where the manifest file can be found, or it can specify a complete file name for the file to be used.

In general, when used, an import process of the MakeIPD mechanism 206 reads a [Deltas] section from some previously-created manifest file to see which deltas were selected. More particularly, when importing a solution, the imported manifest is read to generate a list of prospective delta inputs. Any entries referring to a duplicate file in this package are instead inferred to the original file. Any entries in the imported manifest which identify duplicates are inferred as prospective delta inputs, as well as the reverse. These lists will generally have only one entry per file, or close to N total entries.

As can be readily appreciated, when the import option is used to specify a solution file, most MakeIPD analysis is bypassed, as only the previously-chosen deltas will be used. Note that only approximately N deltas need to be constructed, instead of $N^2$. If the new package contains any new content, those files will not be considered for deltas. If the original package had selected a specific file as a delta reference, and that file is not found in the new package, those deltas will not be considered. However, it should be understood that the import option works best with packages having very similar content.

Figure 5:
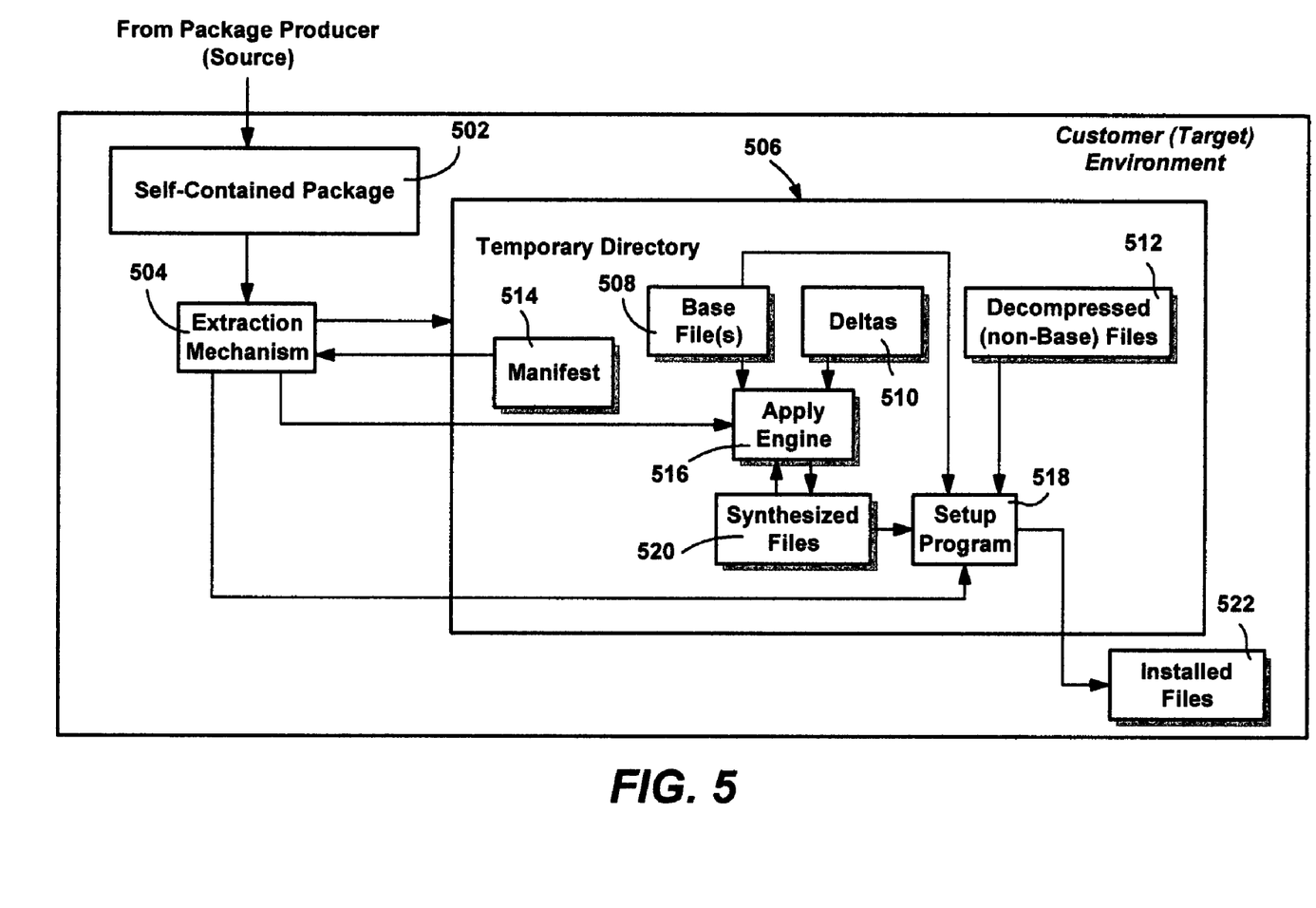
FIG. 5 is a block diagram generally representing components in a customer target environment, such as at a client computer, to extract files from an intra-package delta compression package in accordance with an aspect of the present invention.

Turning to an explanation of the self-extraction process as represented in FIG. 5, at the customer environment 500 a copy of the self-contained package 502 is received in some manner, such as via network transmission or in a physical medium such as a compact or DVD-ROM disk. Note that FIG. 5 shows the package producer as supplying the package, however it is understood that there may be one or more intermediaries, such as a third party distributor, a corporate network that makes the package available to its machines, and so forth.

In general, the extraction mechanism 504 begins when the executable extraction file (e.g., in the self-contained package, but possibly already on the customer machine) is executed is some manner, whether by GUI, network script, command line, and so on. There may be parameters specified, as needed, and these may be parsed.

As a first pre-processing operation, the executable program may create a randomly-named temporary directory 506 on a local hard drive, such as the hard drive having the largest amount of free space. Alternatively, a temporary working directory may be specified, such as via an optional parameter.

Each of the files are extracted from the cabinet file into the temporary directory 506. As part of this extraction, files which were compressed when the cabinet was created are decompressed. Note that there may be other files which were already compressed before the cabinet file was created, and do not get decompressed in this first part of the extraction.

At this time, the directory 506 contains one or more base files 508, one or more deltas 510 and any other files 512, such as a file that was simply compressed when found more efficient to compress than to use delta compression (e.g., the files A and B in the example of FIG. 4). Any files that are still compressed files may be decompressed as needed. The manifest 514, apply engine 516 (e.g., a DLL possibly included with the package) and the setup program 518 (if not itself synthesized) are also available in the directory 506, in this example. Note that a manifest file may not exist, which would be the situation for conventional cabinet compression of files, that is, without intra-package delta compression.

In the event that a manifest 514 exists, as in the example of FIG. 5, the extraction mechanism 504 processes each instruction listed in the manifest 514. For each delta 510 listed therein, the specified delta 510 is applied to the specified input base file (e.g., one of the base files 508 or a previously synthesized file 520) to create the new file, represented in FIG. 5 by the synthesized files 520. Note that the apply engine is essentially the reverse of the delta creation engine, taking a base file as one input, a delta as another, and synthesizing a target file as the output. Like the delta creation engine, suitable apply engines are described in the aforementioned U.S. patent applications. Also, as described below, for each duplicate file, a copy of the specified file is made with the new name, while for each deletion pattern specified in the manifest 514, the extraction mechanism 504 deletes any files in the temporary directory 506 which match that pattern. This is typically used to discard the deltas after all the files have been synthesized.

Figure 6:
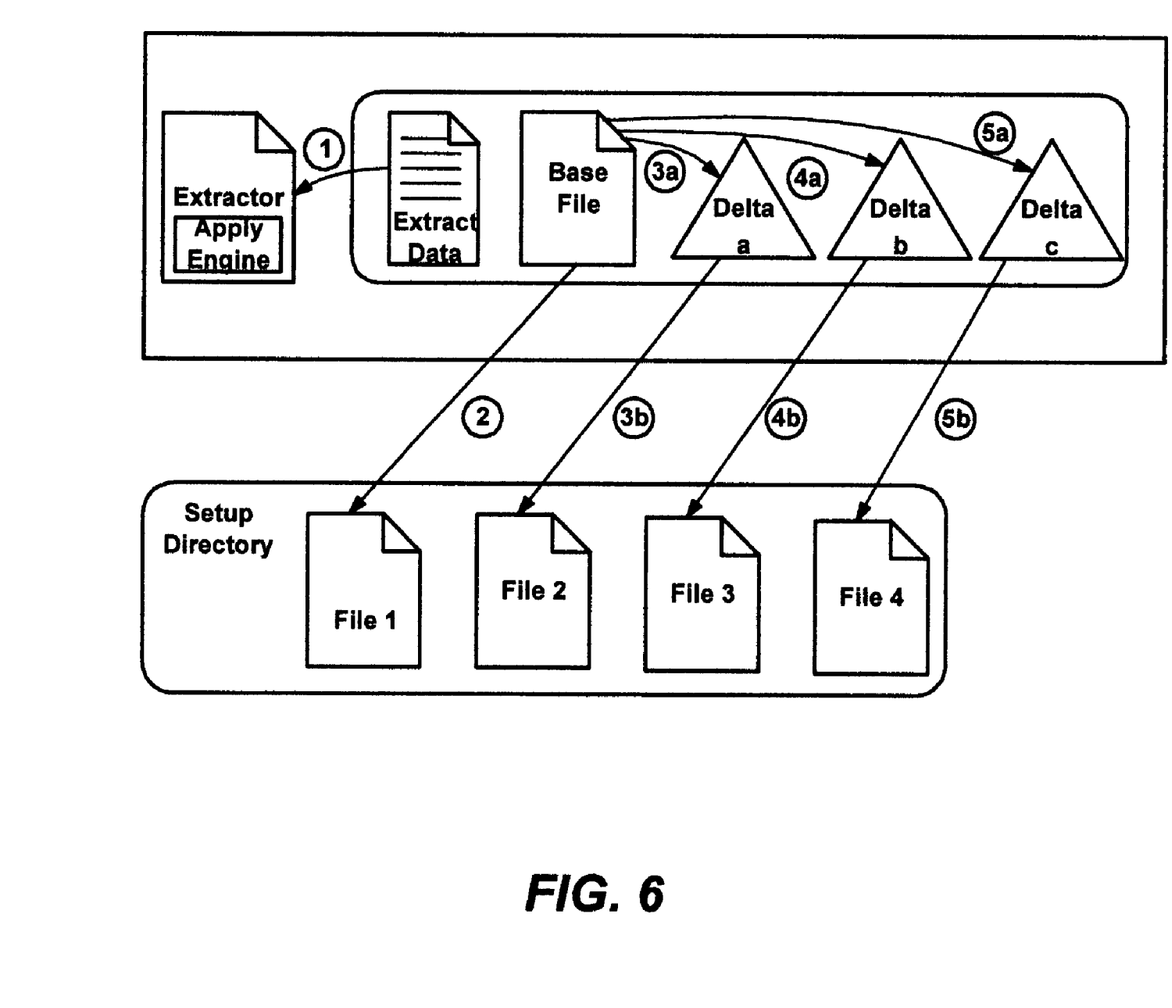
FIG. 6 is a block diagram generally representing extraction of a multiple files by applying multiple deltas to a single base file in accordance with an aspect of the present invention.

By way of example, FIG. 6 shows the files obtained via a self-contained package having a single base file to which three Deltas a, b, and c are applied to synthesize three files, File 2, File 3 and File 4. The base file, File 1 may be used as an update, although as described above this is not required. In general, by following the arrows in the labeled order, it is seen that the extractor reads the extract data (e.g., the manifest), decompressing the base file if necessary into a directory that a setup program will use to install the files. The base file is then used in conjunction with each delta a, b and c to synthesize the files File 2, File 3 and File 4, respectively.

Figure 7:
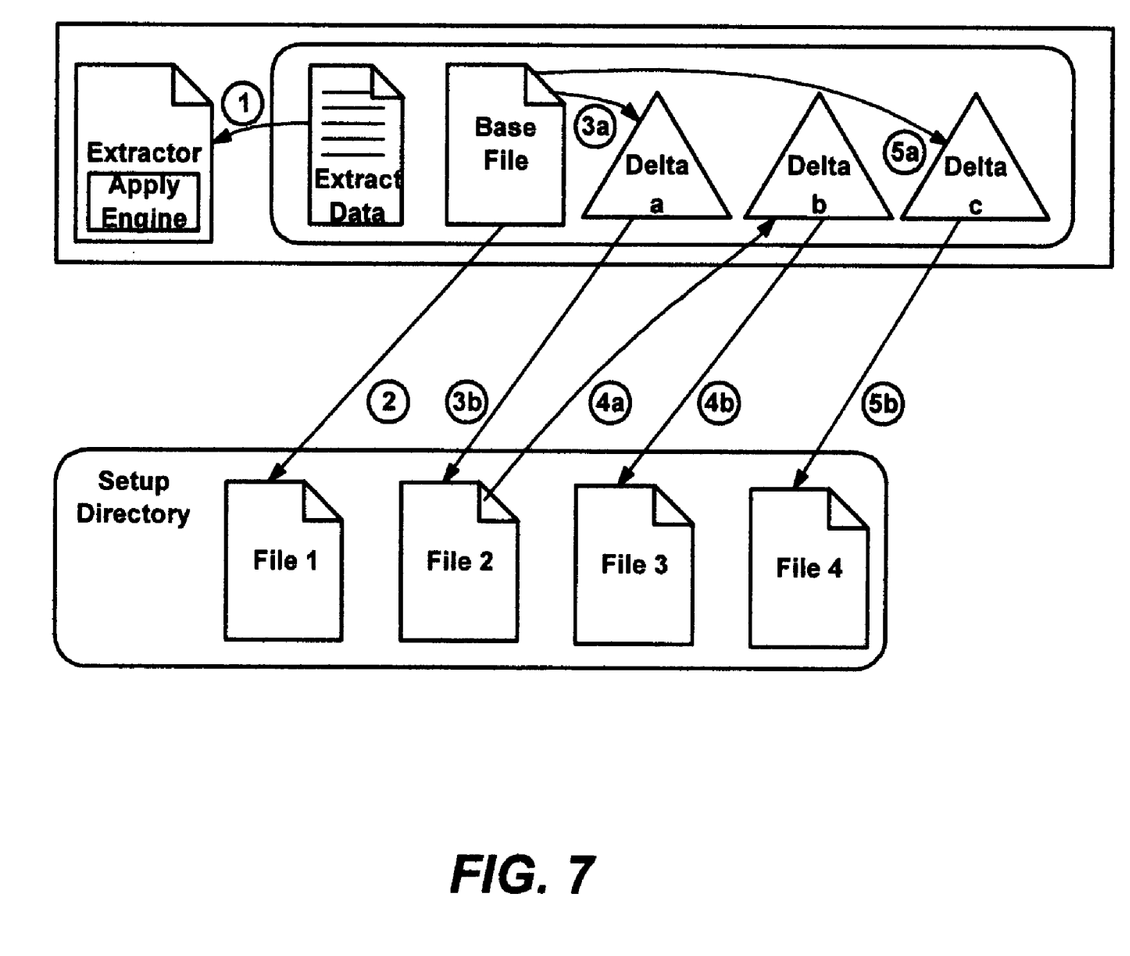
FIG. 7 is a block diagram generally representing extraction of a multiple files by applying a delta to a base file and by applying a delta to a base file that was itself synthesized via delta decompression, in accordance with an aspect of the present invention.

FIG. 7 shows a slightly different example in which File 2 is synthesized from file 1 and Delta a, and then used as a base file with Delta b to synthesize file 3. File 4 is synthesized from the base file and delta c.

Returning to FIG. 5, once the target files are fully available, if a program is marked as a setup program 518 via the RUN directive, that program is automatically executed. Upon completion of the setup program, the extraction mechanism retrieves and saves its return code. Then, the extraction mechanism 504 deletes any remaining files created in the temporary directory, including any directory entries, and exits with the saved return code of the setup program. The extraction mechanism 504 may also be deleted as desired.

Manifest File Information

In one implementation, the intra-package delta features are enabled by the manifest file. However, it can be readily appreciated that other ways of directing an extraction mechanism are feasible. For example, other suitable extraction data may be used. Alternatively, the deltas can be ordered in some manner (e.g., by order of being placed in the temporary directory upon cabinet decompression and so forth) and applied to base files in that order, with the filename derived from the delta or changed via a set of rename operations, for example.

As described below, however, the manifest file provides a straightforward and efficient way to guide the extraction mechanism.

In this particular implementation, the file is named "_sfx_manifest_" in the embedded cabinet file. While extracting the cabinet to the temporary target directory, the extraction mechanism watches for this filename, and uses its contents to specify various processing to be performed after the extraction has been completed. The _sfx_manifest_file is not added to the target directory so as to not confuse the setup program. After this additional processing is completed, the setup program is started.

In one implementation, the manifest is a text file organized into sections denoted by square brackets, although it can be readily appreciated that other formats, such as a markup language format, are equivalent. Each section contains lines with details for an operation. Several section names are defined, including [Deltas], [Copy], [Verify] and [Delete]. Each section contains section-specific entries, which are interpreted according to the section to which they belong. Some entries in a section may begin with a predefined keyword, which is referred to as a directive.

The sections in a manifest can be specified in any order, but are processed in the order of [Deltas], [Copy], [Verify], then [Delete]. Within each section, the entries are processed sequentially. The supported sections are thus found by name, not by their location within the file.

In this format, each section in the file begins with the section name enclosed in brackets, and ends at the beginning of a new section or at the end of the file. If more than one section has the same name, they are logically merged into a single section. Section names, entries, and directives are case-insensitive. Other rules are that each entry and directive in a section ends with a newline character (hex 0x0A) or at the end of the file. Comments begin with a semicolon (;) character and end at the newline character or end of file. Comments can appear on a line by themselves, or after the entry on a line. Commas are used separate the values supplied in section entries and directives, and an equals sign may be required to separate the "key" value from the other parameters.

The filename entries are relative to the package root, although it is feasible to support absolute paths in alternative implementations. Files in subdirectories within the package are represented with relative paths, e.g., a file named "update.exe" which that resides in the "update" subdirectory would be referred to as update\update.exe. Blank lines, leading whitespace (space, tab and so forth) on a line is ignored, as is any whitespace outside of quotes. If a space character, commas, or equals sign are to be part of a string, the string is to be in quotes. An unquoted semicolon character is used for comments, in which everything up to the end of that line is ignored.

File names or relative paths that need to contain spaces or other breaking characters are enclosed in double quotes. Section names must not be quoted. The following is a sample manifest that complies with the above rules:

```
; Sample _sfx_manifest_ for Q326863
; This package contains eight closely-related files
[Options]
    run = xpsp1hfm.exe
[Deltas]
    sp2\ntkrnlpa.exe = sp2__ntkrnlpa__exe.__p, sp2\ntoskrnl.exe
    sp2\ntkrpamp.exe = sp2__ntkrpamp__exe.__p, sp2\ntkrnlpa.exe
    sp2\ntkrnlmp.exe = sp2__ntkrnlmp__exe.__p, sp2\ntkrpamp.exe
    sp1\ntoskrnl.exe = sp1__ntoskrnl__exe.__p, sp2\ntoskrnl.exe
```

-continued

```
sp1\ntkrpamp.exe = sp1__ntkrpamp__exe.__p, sp2\ntkrpamp.exe
sp1\ntkrnlpa.exe = sp1__ntkrnlpa__exe.__p, sp2\ntkrnlpa.exe
sp1\ntkrnlmp.exe = sp1__ntkrnlmp__exe.__p, sp2\ntkrnlmp.exe
[Delete]
   *.__p
[Verify]
   sp1\ntkrnlmp.exe = 1D575A38471CB066CC23925AEFCD9A49
   sp1\ntkrnlpa.exe = 89A0875AEA13E021C9E63F2EB6446327
   sp1\ntkrpamp.exe = 934AAC402BA1F8D1C9319AA0DB849E6F
   sp1\ntoskrnl.exe = C78CA71C81A051DF25A79102C867BB10
   sp2\ntkrnlmp.exe = E62EA04019BC4AE785855DA0EE36D231
   sp2\ntkrnlpa.exe = 6C1BD8121224A83DC0FD9E36BFCF2AD9
   sp2\ntkrpamp.exe = 64F5029190445488347B204DF6A53A6C
   sp2\ntoskrnl.exe = A7379A2180D3AA4F64D804D8B5CDD659
```

The [Deltas] section describes a core feature of intra package deltas, namely how to synthesize some of the files needed for the setup from other files in the package. The syntax for an entry in the [Deltas] section includes:

[Deltas]
   {targetfilename}={deltafilename}[,{reference}]

where {targetfilename} is the name of the file to be produced, {deltafilename} is the name of the delta file in the package, and {reference} is the name of the existing file to be used as the base file, if any. The extractor will apply the delta file to a copy of the reference file, creating the target file.

An example of this syntax includes:

[Deltas]
   file2=file1_to_file2.delta, file1

In this example, file1 needs to be included in the actual package, or synthesized from some previous [Deltas] entry. As is apparent, file1_to_file2.delta will be applied to a copy of file1, creating file2, while file1 is left unchanged. Typically, file1_to_file2.delta would also be included in the [Delete] section, to delete it before the setup program is started.

Note that it is possible to have a "delta" with no reference file, which is equivalent to a delta based on a zero-length reference file. Entries for such deltas simply omit the {reference}.

The [Copy] section allows files to be duplicated within the package. For example, if the setup process requires three identical files with different names, one copy of the file could be included in the package, with the other two replicated prior to setup. The syntax for an entry in the [Copy] section includes:

[Copy]
   {targetfilename}={sourcefilename} where {targetfilename} is the name of the file to be produced, and {sourcefilename} is the name of an existing file with the same content.

An example includes:

[Copy]
   file3=file2

In this example, file2 is included in the package, or is synthesized from a previous [Deltas] or [Copy] entry. As is apparent, file2 is copied to file3, and file2 is left unchanged.

The [Delete] section allows files not needed for setup to be deleted before the setup program is started. A common usage is to delete any delta files used to synthesize the needed files. The syntax for an entry in the [Delete] section is

[Delete]
   {targetfilename} where {targetfilename} is the name of the file to be deleted. The {targetfilename} specified may contain wildcards, in which case any files matching that pattern will be deleted. If no files match the given name or pattern, no error is reported. The file deletion is not recursive; subdirectories must be explicitly named.

An example includes:

[Delete]
   *.delta

In this example, files matching "*.delta" will be deleted.

The [Verify] section specifies certain files to be checked for corruption. Each entry in this section names a single file to be verified, along with the expected MD5 signature for that file. If any file in the section cannot be verified, installation will fail. The syntax for an entry in the [Verify] section includes:

[Verify]
   {targetfilename}={md5signature} where {targetfilename} is the name of a file expected to be in the package, and {md5signature} is the hex representation of that file's MD5 signature.

An example includes

[Verify]
   file1=3D2EDAF98C77086F18925193E471C1C8
   file2=CCF3719A65DB9637864A4340A74575DE
   file3=7BEB665C45858982E58D496C3A474CB2

In this example, signatures for each of the files file1, file2, and file3 are computed, and compared against the specified values. If any of the signatures do not match, or any of the files is missing, installation will fail.

There are some IPD options which can be controlled using specific directives in the [Options] section. Undefined directives are ignored.

[Options]
   Run=update\update.exe ; program to execute
   PatchDLL=update\mspatcha.dll ; updated delta core The Run= directive defines the name of the setup program to be executed. The extractor already allows a program to be marked for execution using the /RUN option in the directives file when creating the cabinet file. However, the program to run may not be one of the files in the cabinet, but may be packaged as a delta based on one of the other files. In this case, there is no file to mark in the cabinet. The Run=directive identifies the program to run, and is functionally equivalent to marking that file in the cabinet. The Run=directive overrides the file marked in the cabinet, if any.

The PatchDLL= directive defines the name of the DLL used to apply deltas. By default, the extractor will use mspatcha.dll from the Windows system directory, but this directive can explicitly name an alternate file from the package. As the files specified in the manifest are relative to the target directory, this DLL is one of the files in the raw package. The [Delete] section would typically contain an entry to discard this DLL before the setup program starts.

Traditionally, a cabinet package is simply executed, in that its contents are expanded, the setup program runs, and the contents are cleaned up. For various reasons, it may also be desirable to expand the contents of a package, but not run setup or cleanup operations. For example, a vendor may need to obtain one or more files found in a package, but does not want the package actually installed on this computer. A parameter option provides this feature, which when used, prompts the user for a destination directory (or it is explicitly given using /X:targetdir) and the contents are simply expanded there.

The intra-package delta system and method of the present invention also support this concept. When this parameter option (or /X:targetdir) is used, the extractor will extract the contents without running the setup program. However, when the contents include any delta files, those deltas will generally not be of use in their present form, so the intra package delta processing is still performed by default, to get the contents back to their natural form.

Some operating systems permit file associations to be made, wherein a specific program can be associated with a certain type of file. Some allow association by file name suffix (the "extension") while others may use other attributes of the file. It can be seen that the self-extracting package described herein could be implemented using only a file collection, such as a cabinet file, relying on a file association to start the self-extraction process when the file is activated. Thus the executable code for the self-extracting feature does not have to be a part of the package.

As can be seen from the foregoing detailed description, there is provided a method and system by delta compression can be used to provide data in a self-contained package. The package size is significantly reduced, yet the benefits of a self-contained package are made available to vendors and client customers. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

Each of the patents referred to herein are assigned to the assignee of the present invention and hereby incorporated by reference.

What is claimed is:

1. A method in a computing environment for intra-package delta compression, the method comprising:
   receiving information corresponding to a plurality of source files;
   for each of the plurality of source files, generating a list of prospective delta inputs, the list of prospective delta inputs including an entry for each other unique source file in the plurality of source files;
   an iterator creating a delta for each prospective delta input within each file's list of prospective delta inputs;
   based on the deltas created for each prospective delta input within each file's list of prospective delta inputs and the received source files, creating a base file for a package based upon a minimal package size;
   generating a file-specific delta from the base file and a source file;
   calculating signatures for each of the plurality of source flies;
   generating a manifest file by creating a linked list of the plurality of source files, the manifest file comprising instructions needed to perform an extraction, the instructions being particularly ordered in the manifest file and the ordering of the instructions corresponding to an ordering of the linked list, and the manifest file comprising a delta section, a copy section, a verify section, and a delete section;
   saving in the manifest file the file name and signatures for each source file to be verified; and
   packaging the manifest file, base file and the file-specific delta into a self-contained package.

2. The method of claim 1 further comprising, packaging data for directing a client extractor to synthesize a target file corresponding to a source file from the base file and the delta.

3. The method of claim 1 further comprising, setting at least one file name by which a client extractor may synthesize a target file corresponding to a source file from the base file and the delta.

4. The method of claim 1 wherein at least two of the plurality of source files are not different versions of the same file.

5. The method of claim 1 wherein at least two of the plurality of source files are not different language translations of the same file.

6. The method of claim 1 wherein at least two of the plurality of source files are different language translations of the same file.

7. The method of claim 1 further comprising:
   constructing a directed graph;
   adding each source file in the plurality of files as a vertex in the graph,
   adding each prospective delta as an edge of the graph,
   giving weight to each edge of the graph corresponding to the size of the associated prospective delta;
   adding a null vertex to the graph;
   adding edges from the null vertex to each other vertex of the graph,
   adding a weight to each edge of the null vertex equal to the size of the compressed file corresponding to the each other vertex; and
   selecting a first source file based on information in the directed graph.

8. The method of claim 7 wherein selecting the first source file comprises applying a minimum spanning tree or like algorithm to the directed graph.

9. The method of claim 1 further comprising, providing the package to a recipient, the recipient applying the delta to a first source file to synthesize a second source file.

10. A computer-readable storage medium having computer-executable instructions for performing the method of claim 1.

* * * * *